Nov. 1, 1927.

H. C. MALLORY 1,647,185

METHOD OF PRODUCING EXPANSIBLE COLLAPSIBLE ELEMENTS

Original Filed Aug. 31, 1920

Patented Nov. 1, 1927.

1,647,185

UNITED STATES PATENT OFFICE.

HARRY C. MALLORY, DECEASED, LATE OF BELLPORT, NEW YORK, BY SUE R. MALLORY, ADMINISTRATRIX, OF BELLPORT, NEW YORK; HARRY C. MALLORY, ASSIGNOR, BY MESNE ASSIGNMENTS, TO AMERICAN RADIATOR COMPANY, OF CHICAGO, ILLINOIS, A CORPORATION OF NEW JERSEY.

METHOD OF PRODUCING EXPANSIBLE-COLLAPSIBLE ELEMENTS.

Original application filed August 31, 1920, Serial No. 407,210. Divided and this application filed July 25, 1925. Serial No. 46,104.

The invention relates to improvements in metallic expansible-collapsible elements adapted for use in connection with thermo-sensitive or pressure sensitive devices, and for other purposes, and the same has for its object to provide an element having an extremely sensitive body portion, and less sensitive or flexible end portions extending therefrom.

Further, said invention has for its object to provide an expansible-collapsible element having a flexible or elastic body portion, a substantially inelastic or rigid portion or portions extending therefrom, and intermediate portions possessing less elasticity or flexibility connecting said elastic or flexible body portion with said inelastic or rigid end portion or portions.

Further, said invention has for its object to provide an expansible-collapsible element having a flexible or elastic body portion, a substantially inelastic or rigid heavier end portion extending from one or both of the ends of said body portion, and annular portions whose walls taper from said heavier end portions towards said body portion and provided with corrugations which become progressively shallower as the same approach said heavier end portions with which the same merge.

Further, said invention has for its object to provide a simple, convenient and inexpensive method of producing an expansible-collapsible element of the character specified.

Other objects will in part be obvious, and in part be pointed out hereinafter.

To the attainment of the aforesaid objects and views the invention consists in the several steps constituting the method hereinafter more fully described, and then pointed out in the claims.

In the accompanying drawings forming part of this specification, wherein like numerals of reference indicate like parts, Figure 1 is a side elevation showing one form of expansible-collapsible element constructed according to, and embodying the said invention;

Figure 1:
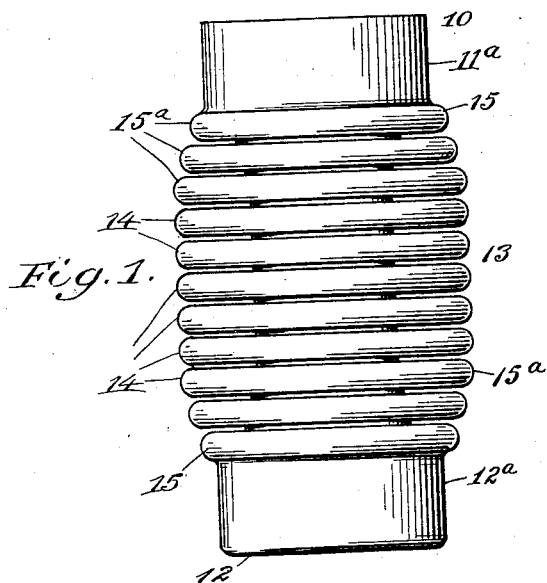
Figure 2:
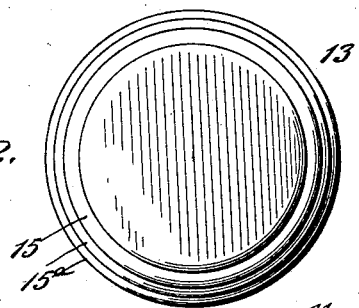
Fig. 2 is a bottom view thereof.
Figure 3:
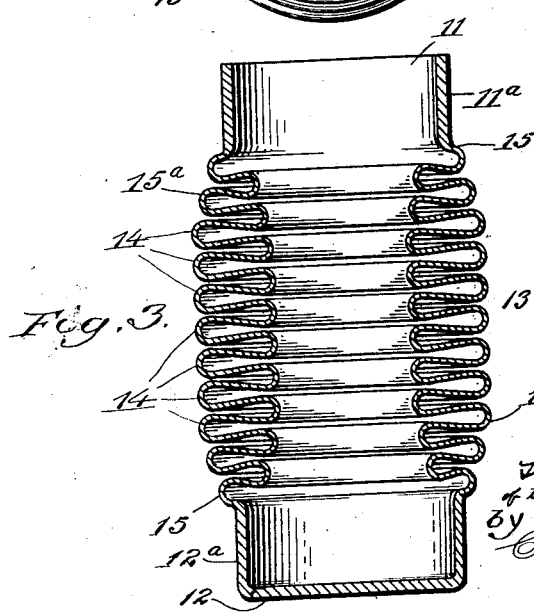
Fig. 3 is a central vertical section.

In said drawings 10 designates a cylindrical shell having an open end portion 11, a closed end portion 12, and an intermediate or body portion 13. The shell 10 is provided adjacent to its ends 11 and 12 with flat, substantially inelastic annular portions $11^a$, $12^a$, respectively, the walls of which are made considerably thicker than the wall of the intermediate or body portion 13. As shown in the drawings the closed end 12 is of the same thickness as the annular portion $12^a$ from which it is formed.

The wall of the body portion 13 is made uniformly thinner than the end portions 11, 12, and is provided with a series of parallel circumferential corrugations 14. Between the ends of the corrugated body portion 13 and the end portions 11, 12 are formed annular, tapering portions 15, which become thinner as the same approach the opposite end portions of the corrugated body portion 13 with which the same merge.

The tapering, annular portions 15 are provided with circumferential corrugations $15^a$, which become progressively shallower as the metal of the shell wall in which they are formed becomes heavier. That is to say, the corrugations are deeper and most elastic at the central part of the intermediate or body portion and become shallower as they recede from said corrugated intermediate or body portion 13 whereby the flexing movement of the elastic body portion of the shell is distributed over a greater area to obviate the liability of the flexible body part of the shell becoming fractured where the same unites with the substantially inelastic or rigid end portions 11, 12.

It will, of course, be understood that the shell 10 may be made with both end portions open, although it is herein shown as having an open end and a closed end. The closed end 12 and the annular portion $12^a$ extending therefrom as well as the annular portion $11^a$ at the open end may be made heavier or of greater thickness than the corrugated intermediate or body portion. One of said ends may also be heavy or thick and the other end thinner, or both of said ends may be formed thinner than said body portion.

In this case no claim is made for the product resulting from the process herein described and claimed, as said product constitutes the subject matter of an application, Serial Number 407,210, filed by Harry C. Mallory August 31, 1920, and patented July 28, 1925, No. 1,547,431, of which this application is a division.

Having thus described the said invention, what is claimed and desired to secure by Letters Patent is:—

1. The process of making an expansible-collapsible element which consists in taking a tubular shell having an inelastic tubular end portion, and forming in the intermediate portion of said shell circumferential corrugations successively diminishing in depth towards said end portion, substantially as specified.

2. The process of making an expansible-collapsible element which consists in forming a shell comprising an intermediate portion and end portions, and circumferentially corrugating said intermediate portion and forming therein corrugations successively diminishing in depth towards each of said end portions, substantially as specified.

3. The process of making an expansible-collapsible element which consists in forming a shell comprising a body portion, an end portion having a wall of greater thickness than that of said body portion, and a tapering portion uniting said body portion with said end portion, circumferentially corrugating said body portion, and forming in said tapering portion corrugations successively diminishing in depth towards said end portion, substantially as specified.

4. The process of making an expansible-collapsible element which consists in forming a shell comprising a body portion, end portions having walls of greater thickness than that of said body portion, and tapering portions uniting said body portion with said end portions, circumferentially corrugating said body portion, and forming in each of said tapering portions corrugations successively diminishing in depth towards the end portion adjacent thereto, substantially as specified.

5. The process of making an expansible-collapsible element which consists in forming a shell comprising a body portion and an end portion, circumferentially corrugating said body portion, and forming a series of corrugations of gradually diminishing depth intermediate said body and end portions, substantially as specified.

6. The process of making an expansible-collapsible element which consists in forming a shell comprising a body portion and end portions, circumferentially corrugating said body portion, and forming series of corrugations of gradually diminishing depth intermediate said body portion and said end portions, substantially as specified.

7. The process of making an expansible-collapsible element which consists in forming a shell having a cylindrical body portion, an open end portion and a closed end portion, circumferentially corrugating said body portion with a series of corrugations or folds of uniform depth, and forming series of corrugations of gradually diminishing depth uniting said body portion with said end portions, substantially as specified.

8. The process of making an expansible-collapsible element which consists in forming a shell comprising a body portion, an end portion of greater thickness than said body portion, and an annular tapering portion uniting said body portion with said end portion, circumferentially corrugating said body portion with corrugations or folds of uniform depth, and corrugating said tapering portion with corrugations becoming shallower as the same approach said end portion with which the same merge, substantially as specified.

9. The process of making an expansible-collapsible element which consists in forming a shell comprising a cylindrical body portion, end portions of greater thickness than said body portion, and annular tapering portions uniting said body portion with said end portions, circumferentially corrugating said body portion with corrugations or folds of uniform depth, and corrugating said tapering portions with corrugations becoming shallower as the same approach said end portions with which the same merge, substantially as specified.

Signed at the city of New York, in the county and State of New York, this 22nd day of July, one thousand nine hundred and twenty-five.

SUE R. MALLORY,
*Administratrix of the Estate of Harry C. Mallory, Deceased.*